United States Patent
Nee et al.

(10) Patent No.: US 9,580,890 B2
(45) Date of Patent: Feb. 28, 2017

(54) MACHINE ACTIVITY MONITOR WITH SPEED BASED CONDITIONAL

(71) Applicant: Caterpillar Inc., Peoria, IL (US)

(72) Inventors: Brett M. Nee, Germantown Hills, IL (US); Michael J. Kresca, Peoria, IL (US); Nischol N. Antao, Peoria, IL (US); Swetha Ramegowda, Dunlap, IL (US); Michael T. Bly, Peoria, IL (US); Jason W. Stroh, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/681,926

(22) Filed: Apr. 8, 2015

(65) Prior Publication Data

US 2016/0130788 A1 May 12, 2016

Related U.S. Application Data

(63) Continuation-in-part of application No. 14/535,486, filed on Nov. 7, 2014, now abandoned.

(51) Int. Cl.
*B60T 17/22* (2006.01)
*G05B 9/02* (2006.01)
*E02F 9/26* (2006.01)

(52) U.S. Cl.
CPC .............. *E02F 9/26* (2013.01); *B60T 17/22* (2013.01)

(58) Field of Classification Search
CPC ...... B60T 17/22; B60T 8/1706; B60T 13/261; B60T 8/17616; B60T 13/665; B62D 21/186; B60K 28/00; B60W 10/02; G05B 9/02; H02J 1/08; G05G 1/30
USPC ..... 701/2, 50, 23; 296/190.08; 303/9.64, 15; 192/220.1; 180/286; 188/156; 74/560
See application file for complete search history.

(56) References Cited

U.S. PATENT DOCUMENTS

| | | | |
|---|---|---|---|
| 3,759,357 A | 9/1973 | Bianchetta | |
| 3,985,210 A | 10/1976 | Hodge et al. | |
| 3,999,641 A * | 12/1976 | Luttrell | B60W 10/02 192/109 A |
| 4,063,624 A * | 12/1977 | Beck | B60T 13/261 188/106 P |
| 4,076,093 A * | 2/1978 | Mizuno | B60K 28/00 180/286 |
| 5,104,203 A * | 4/1992 | Ferri | B60T 13/665 303/128 |
| 6,135,230 A | 10/2000 | Schenck et al. | |
| 6,371,575 B1 | 4/2002 | Lewis et al. | |
| 7,391,309 B2 | 6/2008 | Chartier et al. | |
| 2003/0121361 A1 * | 7/2003 | Laws | G05G 1/30 74/560 |
| 2003/0221922 A1 | 12/2003 | Callow | |

(Continued)

*Primary Examiner* — Yuri Kan
(74) *Attorney, Agent, or Firm* — Caterpillar Inc.; James Bennin

(57) ABSTRACT

A control system for a machine having a brake is disclosed. The control system may include an operator interface configured to receive inputs from an operator of the machine, and output data to the operator of the machine, and a controller in communication with the operator interface. The controller may be configured to monitor operator inputs received by the operator interface, monitor a speed of the machine, and send a signal to the operator interface to notify the operator to apply the brake based at least in part on the operator inputs and the speed of the machine.

24 Claims, 6 Drawing Sheets

(56) References Cited

U.S. PATENT DOCUMENTS

| | | | |
|---|---|---|---|
| 2005/0146207 A1* | 7/2005 | Wagner | B60T 8/1706 |
| | | | 303/9.64 |
| 2008/0006491 A1* | 1/2008 | Degoul | H02J 1/08 |
| | | | 188/156 |
| 2011/0272966 A1* | 11/2011 | Kawashiri | B62D 21/186 |
| | | | 296/190.08 |
| 2012/0150362 A1* | 6/2012 | Kolbe | B60T 8/17616 |
| | | | 701/2 |
| 2014/0222300 A1 | 8/2014 | Kakela et al. | |
| 2016/0031448 A1* | 2/2016 | Sakai | G05B 9/02 |
| | | | 701/23 |
| 2016/0130788 A1* | 5/2016 | Nee | B60T 17/22 |
| | | | 701/50 |

* cited by examiner

MACHINE ACTIVITY MONITOR WITH SPEED BASED CONDITIONAL

CROSS-REFERENCE TO RELATED APPLICATION

This application is a continuation in part under 35 U.S.C. §120 of U.S. patent application Ser. No. 14/535,486, filed on Nov. 7, 2014.

FIELD OF THE DISCLOSURE

The present disclosure relates generally to machines and, more particularly, to control systems and methods for alerting an operator of a machine to apply a brake.

BACKGROUND OF THE DISCLOSURE

Large mining trucks, and other machines, may be used to transport excavated materials, such as, soil, rock, ore, coal, sand, and the like, around and away from a mining site. For example, the large trucks may be used for loading, hauling, and dumping. Typically, mining trucks include a chassis which supports a dump body and an operator cab. The dump body may generally include a bed or receptacle for holding the excavated material.

During a work cycle, a mining truck spends periods of time in a stationary position. For instance, the truck may be stationary when loading material into the bed of the truck, dumping material from the truck bed, and waiting in line to be loaded. While in the stationary position, an operator may forget to apply the brakes on the large truck. Omission of activating the brakes may lead to situations where the truck has become a "runaway." The large mining truck may then roll into an object, which may cause various levels of damage.

A system and method of controlling a mobile machine are disclosed in U.S. Patent Application Publication No. 2014/0222300 A1, entitled, "Mobile Machine, Braking System and Method of Controlling Mobile Machine." The 2014/0222300 publication describes a control system that is arranged to engage the braking system automatically and activate the parking brake devices when the carrier is determined to be stationary. More specifically, the 2014/0222300 control system detects intentional moving of the carrier in a forward or reverse direction via sensors for a drive control element. The sensed information and a non-driving stationary period are used for controlling automatic parking brakes of the mobile machine.

While effective, improvements in monitoring machine activity are desired to reduce false detection of a stationary period of the machine. Furthermore, it may not be productive to automatically apply the brakes upon immediate detection of the non-driven stationary period.

SUMMARY OF THE DISCLOSURE

In accordance with one embodiment, a control system for a machine having a brake is disclosed. The control system may include an operator interface configured to receive inputs from an operator of the machine, and output data to the operator of the machine, and a controller in communication with the operator interface. The controller may be configured to monitor operator inputs received by the operator interface, monitor a speed of the machine, and send a signal to the operator interface to notify the operator to apply the brake based at least in part on the operator inputs and the speed of the machine.

In accordance with another embodiment, a machine is disclosed. The machine may include a braking system, an operator interface, and a controller in communication with the braking system and the operator interface. The braking system may include a brake. The operator interface may be configured to receive inputs from an operator of the machine, and output data to the operator of the machine. The controller may be configured to receive signals from the operator interface indicative of operator inputs, receive a signal indicative of a speed of the machine, determine whether the machine is in an inactive state based at least in part on the signals indicative of operator inputs and the speed of the machine, and send a signal to the operator interface to notify the operator to engage the brake when the machine is in the inactive state.

In accordance with yet another embodiment, a method for alerting an operator of a machine to apply a brake of the machine is disclosed. The machine may have a controller in communication with an operator interface. The method may include determining operator inactivity based on signals received from the operator interface using the controller, determining machine inactivity based at least in part on a signal indicative of a speed of the machine using the controller, determining the machine is in an inactive state based at least in part on determination of operator inactivity and machine inactivity using the controller, and alerting the operator to apply the brake when the machine is in the inactive state using the controller.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

The present disclosure provides a system and method for alerting an operator of a machine to apply a brake of the machine. The system and method monitor operator inputs and the machine's dynamic attributes to determine if the machine is in an active state or an inactive state. When the machine is in the inactive state and the brakes are not applied, an audio and/or visual alarm will be triggered to alert the operator to apply the brakes. Furthermore, after the alert is generated and the operator still does not apply the brakes after a predetermined time period, the system and method will automatically activate a parking brake of the machine.

Reference will now be made in detail to specific embodiments or features, examples of which are illustrated in the accompanying drawings. Generally, corresponding reference numbers will be used throughout the drawings to refer to the same or corresponding parts.

Figure 1:
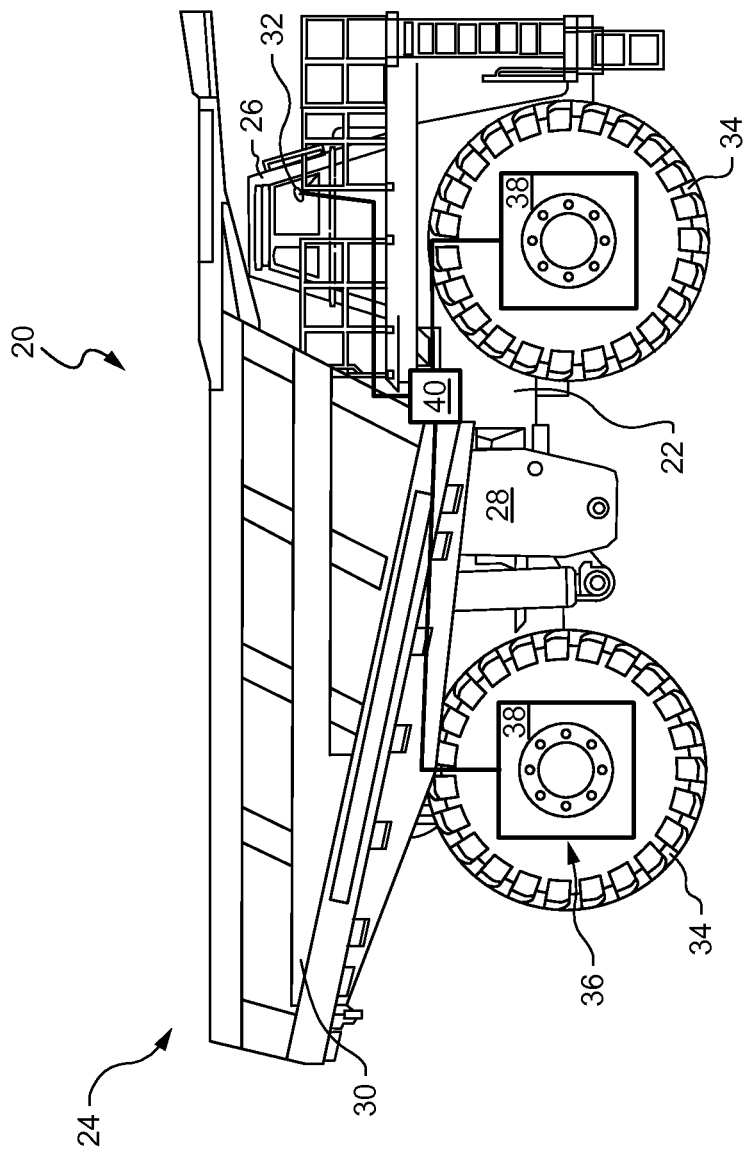
FIG. 1 is a diagrammatic view of machine, in accordance with one embodiment of the present disclosure.

FIG. 1 illustrates a machine 20 consistent with certain embodiments of the present disclosure. It is to be understood that although the machine 20 is illustrated as a mining truck, the machine 20 may be of any other type. As used herein, the term "machine" refers to a mobile machine that performs a driven operation involving physical movement associated with a particular industry, such as, mining, construction, landscaping, forestry, transportation, agriculture, etc.

Non-limiting examples of machines include commercial and industrial machines, such as, mining vehicles, on-highway vehicles, trains, earth-moving vehicles, loaders, excavators, dozers, motor graders, tractors, trucks, backhoes, agricultural equipment, material handling equipment, and other types of machines that operate in a work environment. It is to be understood that the machine 20 is shown primarily for illustrative purposes to assist in disclosing features of various embodiments, and that FIG. 1 does not depict all of the components of a machine.

The machine 20 may include a chassis 22 that supports a dump body 24, an operator cab 26, and a propulsion system 28. The dump body 24 may include a bed 30 or receptacle for holding excavated material. The operator cab 26 may include an operator interface 32 configured to receive input from and output data to an operator of the machine 20. The operator interface 32 may include a plurality of operator controls for controlling operation of the machine 20 and dump body 24 (or other implements connected thereto). Examples of operator controls may include, one or more pedals, joysticks, buttons, switches, dials, levers, steering wheels, keyboards, touchscreens, displays, monitors, screens, lights, speakers, horns, sirens, buzzers, voice recognition software, microphones, control panels, instrument panels, gauges, etc.

Operatively connected to the chassis 22 may be fraction devices 34. The propulsion system 28 may be configured to propel the machine 20 and drive the traction devices 34. For example, the propulsion system 28 may include one or more power sources, engines, motors, drives, transmissions, axles, clutches, pumps, valve, cylinders, etc. Although the traction devices 34 are shown as wheels, in FIG. 1, traction devices 34 may also be tracks or of any other type.

A braking system 36 may be configured to brake the machine 20. Braking system 36 may include at least one brake, such as, braking mechanisms 38 operatively coupled to the traction devices 34. However, braking mechanisms 38 may be coupled to other components of the machine 20 than the traction devices 34. Braking mechanisms 38 may comprise, one or more disc brakes, drum brakes, frictional brakes, regenerative brakes, electric brakes, electro-hydraulic brakes, electromagnetic brakes, latching brakes, and combinations thereof.

Figure 2:
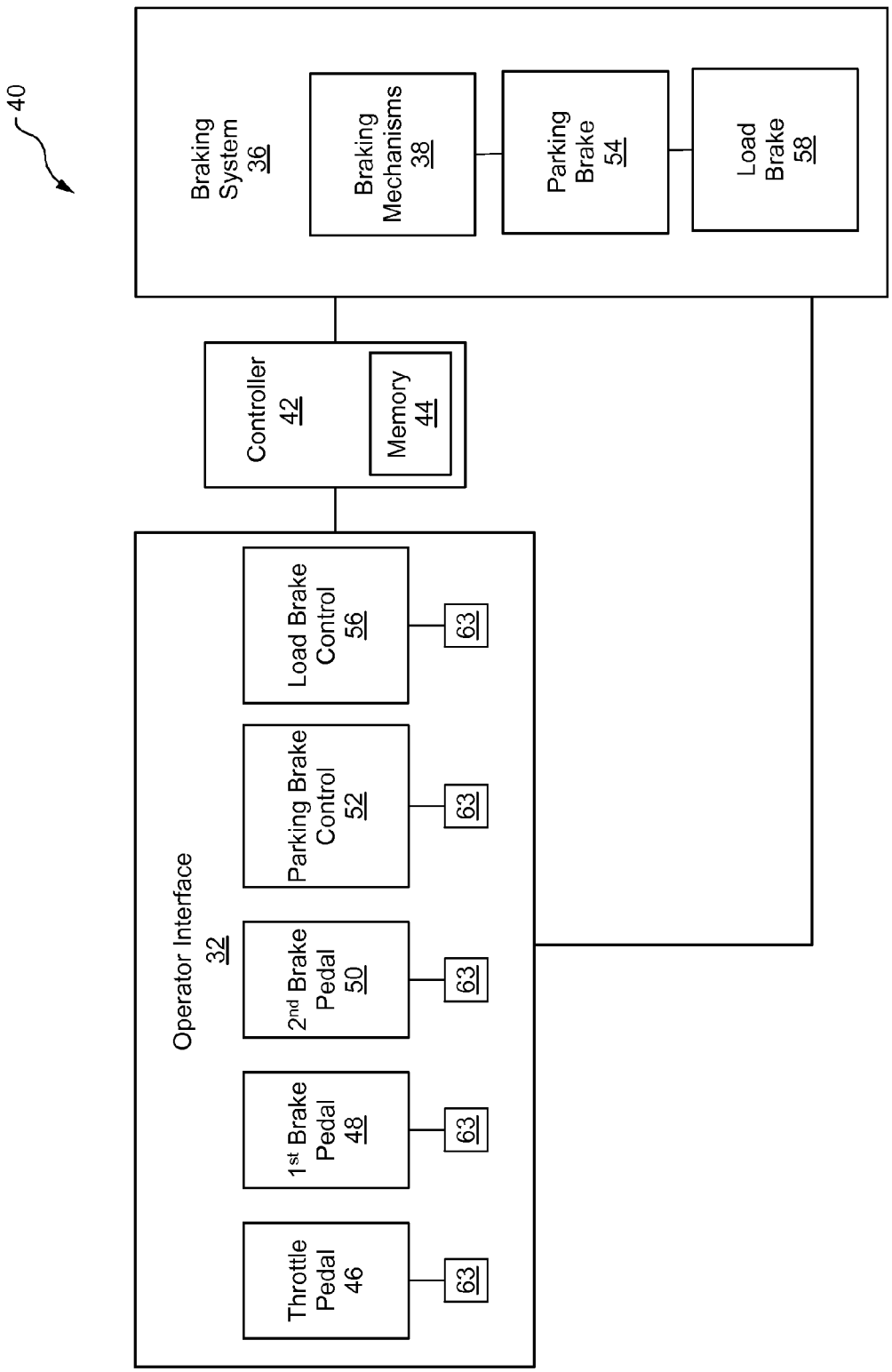
FIG. 2 is a diagrammatic view of a control system for the machine of FIG. 1.

Referring now to FIG. 2, with continued reference to FIG. 1, a control system 40 for the machine 20 is shown, in accordance with an embodiment of the present disclosure. The control system 40 may include a controller 42 in communication with the operator interface 32 and the braking system 36. The controller 42 may be implemented using one or more of a processor, a microprocessor, a microcontroller, a digital signal processor (DSP), a field-programmable gate array (FGPA), an electronic control module (ECM), an electronic control unit (ECU), and a processor-based device that may include or be associated with a non-transitory computer readable storage medium having stored thereon computer-executable instructions, or any other suitable means for electronically controlling functionality of the machine 20. Although the controller 42 is shown (in FIG. 1) to be onboard the machine 20, the controller 42 may also be off-board the machine 20.

The controller 42 may be configured to operate according to predetermined algorithms or sets of instructions for operating the operator interface 32 and the braking system 36. Such algorithms or sets of instructions may be programmed or incorporated into a memory 44 that is associated with or at least accessible to the controller 42. The memory 44 may be provided within and/or external to the controller 42, and may comprise a non-volatile memory. It is understood that the control system 40 and controller 42 may include other hardware, software, firmware, or combinations thereof.

As shown in FIG. 2, a throttle pedal 46, a first brake pedal 48, a second brake pedal 50, a parking brake control 52, and a load brake control 56 may be included in the operator interface 32. The throttle pedal 46 may be operatively connected to the controller 42 and propulsion system 28 in order for the operator to control engine power and acceleration of the machine 20. The first brake pedal 48, the second brake pedal 50, the parking brake control 52, and the load brake control 56 may be operatively connected to the controller 42 and braking system 36 in order for the operator to control braking of the machine 20.

The first brake pedal 48 may provide a first brake circuit for actuating the braking system 36, and the second brake pedal 50 may provide a second brake circuit for actuating the braking system 36. Each of the first and second brake circuits may comprise a separate hydraulic, pneumatic, mechanical, or electrical circuit that actuates braking mechanisms 38. For instance, the first and second brake pedals 48, 50 may comprise foot pedals that allow the operator to slow and/or stop the machine 20 while it is in motion.

In an example, the first brake pedal 48 may comprise a combination or "combo" pedal for both electric and mechanical braking In this embodiment, the combo pedal may apply electric retarding torque, such as, in regenerative brakes, and may also actuate friction brakes or other mechanical brakes. For example, a first range of motion of the combo pedal may apply electric braking, while a second range of motion of the combo pedal may apply mechanical braking Instead of a combo pedal, a retarder lever or other type of operator control may be used.

The parking brake control 52 may actuate a parking brake 54 of the braking system 36. The load brake control 56 may actuate a load brake 58 of the braking system 36. The parking brake 54 and the load brake 58 may be used to keep the machine 20 stationary and prevent the machine 20 from rolling. For example, each of the parking brake 54 and the load brake 58 may comprise or be operatively connected to braking mechanisms 38, such as, for providing a third brake circuit and a fourth brake circuit, respectively, for actuating braking mechanisms 38. However, each of the parking brake 54 and the load brake 58 may also comprise a separate braking mechanism from braking mechanisms 38. The parking brake control 52 and the load brake control 56 may comprise, for example, a foot pedal, hand lever, switch, or other type of control, configured to allow the operator to engage the parking brake 54 and the load brake 58, respectively.

It is to be understood that other configurations than the first brake pedal 48, the second brake pedal 50, the parking brake control 52, and the load brake control 56 may be used to actuate the braking system 36. Furthermore, other types of operator controls may be used for the first brake pedal 48, the second brake pedal 50, the parking brake control 52, and the load brake control 56 than that described.

Figure 3:
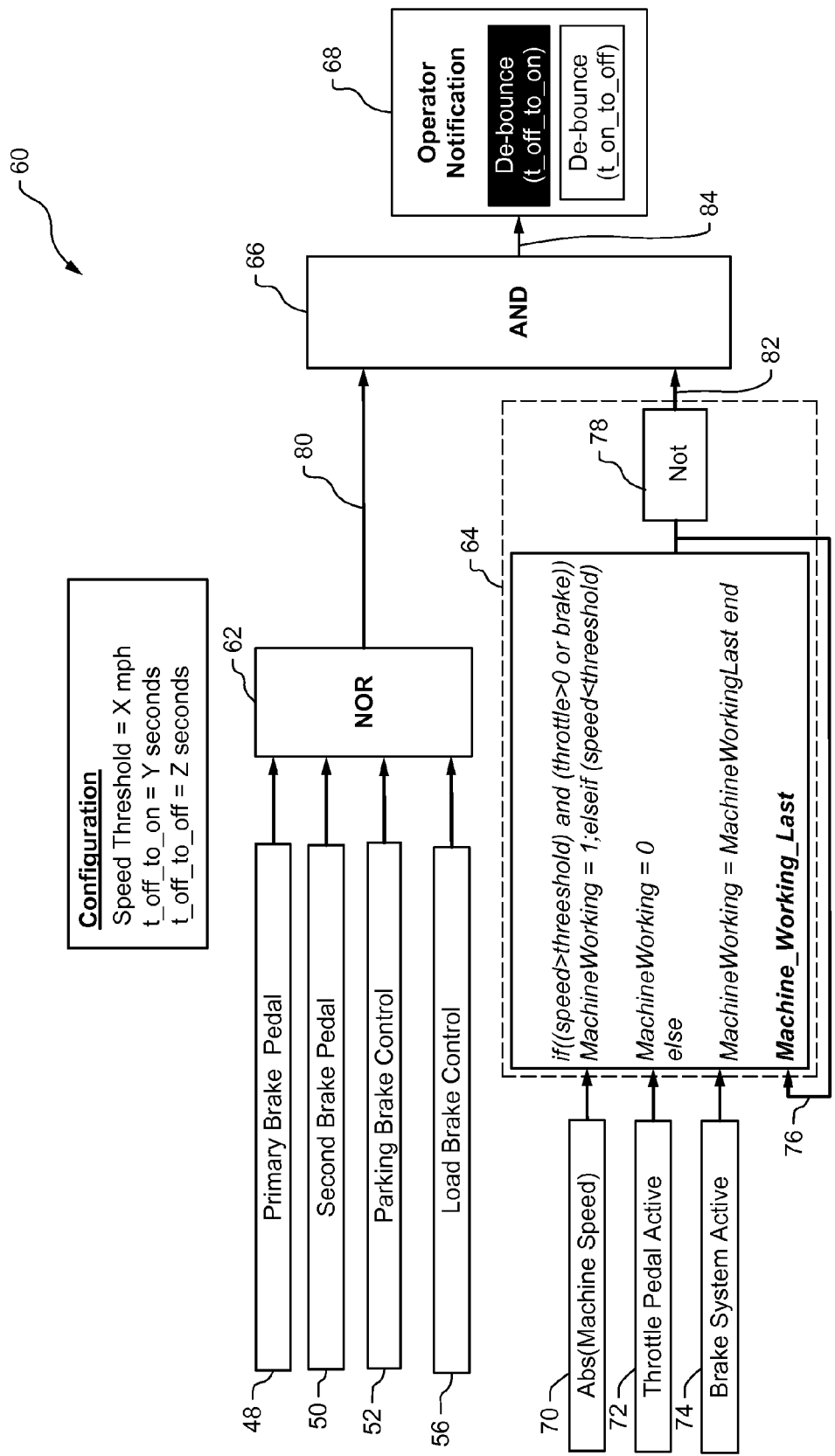
FIG. 3 is a flow diagram illustrating an example algorithm to alert an operator of a machine to apply a brake, in accordance with another embodiment.

Turning now to FIG. 3, with continued reference to FIGS. 1 and 2, a flow diagram 60 illustrating an example algorithm to alert the operator of the machine 20 to apply brakes of the braking system 36 is shown, in accordance with another embodiment. The algorithm may be included in the control system 40 of the machine 20. For example, the algorithm may be programmed into the memory 44 of the controller 42.

The controller 42 may monitor operator inputs, such as, in module 62 and module 64. Operator inputs may comprise input from the operator into the operator controls of the operator interface 32. For example, the controller 42 may monitor operator input into the throttle pedal 46, the first brake pedal 48, the second brake pedal 50, the parking brake control 52, and the load brake control 56. However, other operator inputs may be monitored. One or more sensors 63 (FIG. 2) may be operatively connected to each of the throttle pedal 46, the first brake pedal 48, the second brake pedal 50, the parking brake control 52, and the load brake control 56, and may be configured to detect a position of each.

In an example, each sensor may be configured to detect a percentage of pedal depression and send a corresponding signal to the controller 42. For instance, the signal may be digital, pulse width modulation (PWM), frequency, or analog based. The controller 42 may compare each of the signals from the sensors to predetermined thresholds, such as duty cycle thresholds, programmed into the memory 44 of the controller 42. In so doing, the controller 42 may determine if the operator actuated the throttle pedal 46, the first brake pedal 48, the second brake pedal 50, the parking brake control 52, and the load brake control 56.

More specifically, the controller 42 may determine operator inactivity. For example, based on the signals sent from the associated sensors, the controller 42 may determine when the first brake pedal 48, the second brake pedal 50, the parking brake control 52, and the load brake control 56 are not being used by the operator. This may be implemented by module 62, which is representative of a NOR logic gate in FIG. 3. However, other implementations may be used as well.

When any one of the first brake pedal 48, the second brake pedal 50, the parking brake control 52, and the load brake control 56 is actuated, then an 80 output of module 62 is low. This may indicate that the operator has control of the machine 20 through brake modulation, such as in downhill travel, using the first and/or second brake pedals 48, 50. Use of operator controls can signify that the operator is intending for the machine 20 to be active or in a working state. If there is operator activity or the braking system 36 is already engaged, then it is unnecessary to notify the operator to engage the brakes, and the flow diagram 60 does not proceed to operator notification module 68.

When all of the first brake pedal 48, the second brake pedal 50, the parking brake control 52, and the load brake control 56 are not actuated at a same time, then the output 80 of module 62 is high. This may indicate that the operator is inactive and intending for the machine 20 to be in an inactive state. If there is operator inactivity, and the braking system 36 is not engaged, then it may be necessary to notify the operator to engage the braking system 36, and the flow diagram 60 may proceed to module 66.

In addition to monitoring operator inputs, the controller 42 may also monitor machine movement, such as a speed 70 of the machine 20 in module 64. The controller 42 may monitor a speed 70 of the chassis 22, a traction device 34, and/or a transmission output. However, other speeds of the machine 20 may be monitored. For example, the machine 20 may include sensors, such as a machine speed sensor, wheel speed sensor, transmission speed sensor, and the like, configured to detect the speed 70 of the machine 20 and send a corresponding signal to the controller 42. However, the speed 70 of the machine 20 may also be estimated or derived through sensorless means by the controller 42.

In module 64, the controller 42 may monitor the speed 70 of the machine with a throttle signal 72 and a brake signal 74 to determine if the machine 20 is in an active state. The throttle signal 72 may indicate if the throttle pedal 46 is active or in use, and the brake signal 74 may indicate if the braking system 36 is active or in use. For example, the controller 42 may compare a percentage of pedal depression of each of the throttle pedal 46, the first brake pedal 48, the second brake pedal 50, the parking brake control 52, and the load brake control 56 to predetermined thresholds programmed into the memory 44 of the controller.

If the percentage of pedal depression of the throttle pedal 46 is greater than the predetermined threshold, then the throttle signal 72 is high, indicating the throttle pedal 46 is active. If the percentage of pedal depression of the throttle pedal 46 is lower than the predetermined threshold, then the throttle signal 72 is low, indicating the throttle pedal 46 is inactive. In a similar manner, if the percentage of pedal depression of any of the first brake pedal 48, the second brake pedal 50, the parking brake control 52, and the load brake control 56 is greater or lower than respective predetermined thresholds, then the brake signal 74 is high or low, respectively, indicating the braking system 36 is active or inactive.

The predetermined thresholds may be the same or different for each of the throttle pedal 46, the first brake pedal 48, the second brake pedal 50, the parking brake control 52, and the load brake control 56. For instance, the predetermined threshold for any of the operator controls may be five percent (5%) or lower. However, other numerical values are certainly possible. Furthermore, the throttle signal 72 and the brake signal 74 may be derived from other components of the machine than the throttle pedal 46, the first brake pedal 48, the second brake pedal 50, the parking brake control 52, and the load brake control 56. In one example, the brake signal 74 may be received from the braking system 36 directly, instead of or in addition to the operator inputs for the braking system 36.

Based on the speed 70 of the machine 20, the throttle signal 72, and the brake signal 74, the controller 42 may determine machine inactivity, such as, in module 64. More specifically, the controller 42 may compare the speed 70 of the machine to a speed threshold preprogrammed into the memory 44 of the controller 42. For example, the speed threshold may be zero (0) kph or rpm, although other values may be used. The speed threshold may depend on the sensing technology used to detect the speed 70.

If the speed 70 is greater than the speed threshold, and the throttle signal 72 or the brake signal 74 is high, then the controller 42 may determine that the machine 20 is active or in a working state. For example, a machine working parameter may be set to high. If the speed 70 is lower than the speed threshold, then the controller 42 may determine that the machine 20 is in an inactive state. In this case, the machine working parameter may be set to low.

Furthermore, if the speed 70 is greater than the speed threshold and both the throttle signal 72 and the brake signal 74 are low, then the module 64 may use a last determined working state of the machine. For instance, the machine working parameter may be set to a last machine working parameter, as indicated by signal 76. The controller 42 may then invert the machine working parameter to determine machine inactivity, such as, by using a NOT logic gate 78. However, other implementations may be used as well. Thus, when the controller 42 determines that the machine 20 is inactive, an output 82 of module 64 is high. When the controller 42 determines that the machine 20 is active, the output 82 of module 64 is low.

At module 66, the controller 42 determines both operator inactivity and machine inactivity, thereby determining an inactive state of the machine 20. When both the output 80 of module 62 is high, indicating operator inactivity, and the output 82 of module 64 is high, indicating machine inactivity, an output 84 of module 66 is high. Otherwise, the output 84 of module 66 is low. Although module 66 is representative of an AND logic gate in FIG. 3, other implementations may be used. When both the operator and the machine 20 are inactive, and the brakes are not set, the control system 40 may need to notify the operator to engage the brakes.

When the output 84 of module 66 is high, the machine 20 is in the inactive state, and the flow diagram 60 proceeds to operator notification module 68. It is to be understood that although the inactive state is determined when the output 84 of the module 66 is high, other modules and configurations may be used to determine an inactive state of the machine 20.

At operator notification module 68, the controller 42 may implement a first de-bounce. As used herein, the term "de-bounce" may refer to any kind of hardware device or software which removes a ripple or bounced signal. De-bounce may be used to provide only one digital value within a time period. As such, de-bounce may enforce a predetermined time delay to filter out noise or other glitches, thereby ensuring a true signal. In one example, the first de-bounce may enforce a ten (10) second delay to trigger operator notification and a zero (0) second delay to stop operator notification. However, other time delays may be used.

In operator notification module 68, the controller 42 determines if the output 84 of module 66 is high, or the machine 20 is in the inactive state. The first de-bounce checks if the machine 20 is in the inactive state for the duration of the time delay. If it is, the controller 42 sends a signal to the operator interface 32 to alert the operator to engage the brakes. The operator interface 32 may then be configured to provide a visual display and/or audio sound to the operator upon receipt of the signal from the controller 42. For example, a message, such as, "Machine is inactive without brakes engaged: apply brakes," may be provided via a pop-up on a display or monitor, and simultaneously, a horn may sound for a predetermined time period. In other examples, the message may be announced over a speaker, or an external siren or horn may go off. Other visual and audio effects may be used as well.

In another embodiment, the control system 40 may be configured to automatically apply the parking brake 54. For example, turning now to FIG. 4, with continued reference to FIGS. 1-3, flow diagram 90 illustrates another example algorithm that may be included in the control system 40 of the machine 20. For example, the algorithm may be programmed into the memory 44 of the controller 42. Flow diagram 90 may be similar to flow diagram 60 (FIG. 3). However, after alerting the operator to engage the brakes in operator notification module 68, the controller 42 may implement a second de-bounce in module 92. For instance, the second de-bounce may enforce a five second (5 sec) delay to trigger automatic application of the parking brake 54 and a zero second (0 sec) delay to stop automatic application of the parking brake 54. However, other time delays may be used.

In one example, the time delays of the first de-bounce and/or second de-bounce may be constant and preprogrammed into memory 44. In another example, the time delays of the first de-bounce and/or second de-bounce may be dynamic. For instance, the controller 42 may determine time delays of the first de-bounce and/or the second de-bounce based on current conditions of the machine 20. In so doing, the first and/or second de-bounce may be adaptive to changing conditions of the machine 20, such as, the speed 70 of the machine 20 and an orientation of the machine 20.

The orientation of the machine 20 may include a position of the machine 20 relative to a terrain of the mining site or other landscape. For example, the machine 20 may include an inclinometer, or other sensor, in communication with the controller 42. The inclinometer may be configured to determine the grade or angle of inclination on which the machine 20 is operating. The orientation of the machine 20 may also be estimated or derived through sensorless means by the controller 42. Based on the speed 70, the orientation, and other attributes of the machine 20, the controller 42 may calculate the time delays of the first and/or second de-bounce according to the current situation of the machine.

Furthermore, the controller 42 may be configured to determine if the parking brake 54 is engaged. For example, the controller 42 may receive signals from the braking system 36 and/or a sensor associated with the parking brake control 52. After operator notification, the second de-bounce checks if the braking system 36 is engaged during the time delay. If the braking system 36 was engaged after operator notification, the controller 42 does not automatically apply the parking brake 54, and the flow diagram does not proceed to module 94. If the controller 42 determines that the braking system 36 was not engaged for the duration of the time delay, then flow diagram 90 may proceed to module 94.

In module 94, the controller 42 may send a signal to the braking system 36 to apply the parking brake 54 in module 94. For example, the signal from the controller 42 may actuate an electro-hydraulic solenoid or proportional valve of the braking system 36, which may then engage the parking brake 54. By first alerting the operator after determining the machine 20 is in the inactive state for a predetermined time delay of a first de-bounce, and subsequently, implementing a second de-bounce before automatically applying the parking brake 54, the control system 40 reduces false detection of stationary periods of the machine 20.

Figure 4:
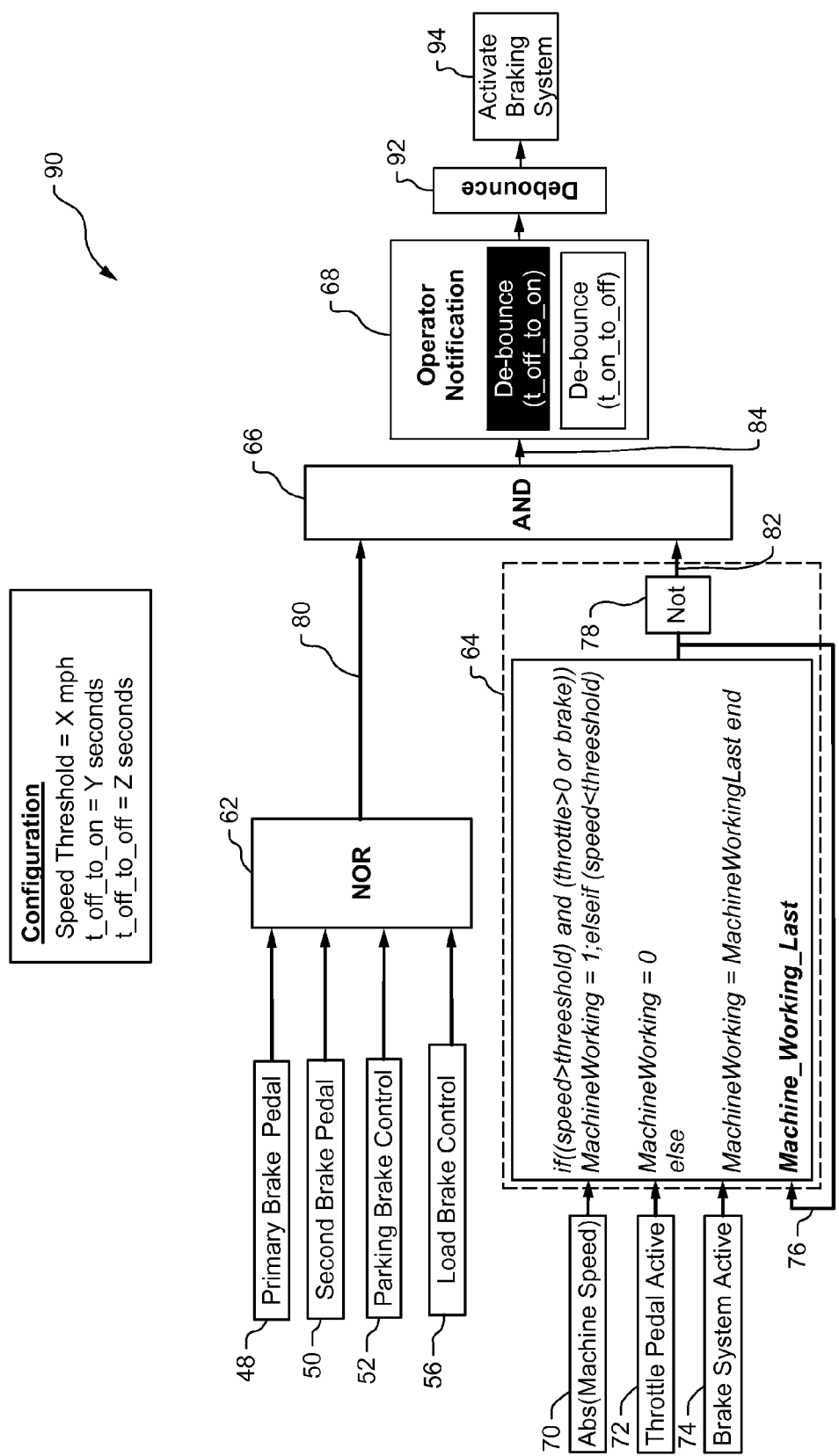
FIG. 4 is a flow diagram illustrating another example algorithm to alert an operator of a machine to apply a brake, in accordance with another embodiment.
Figure 5:
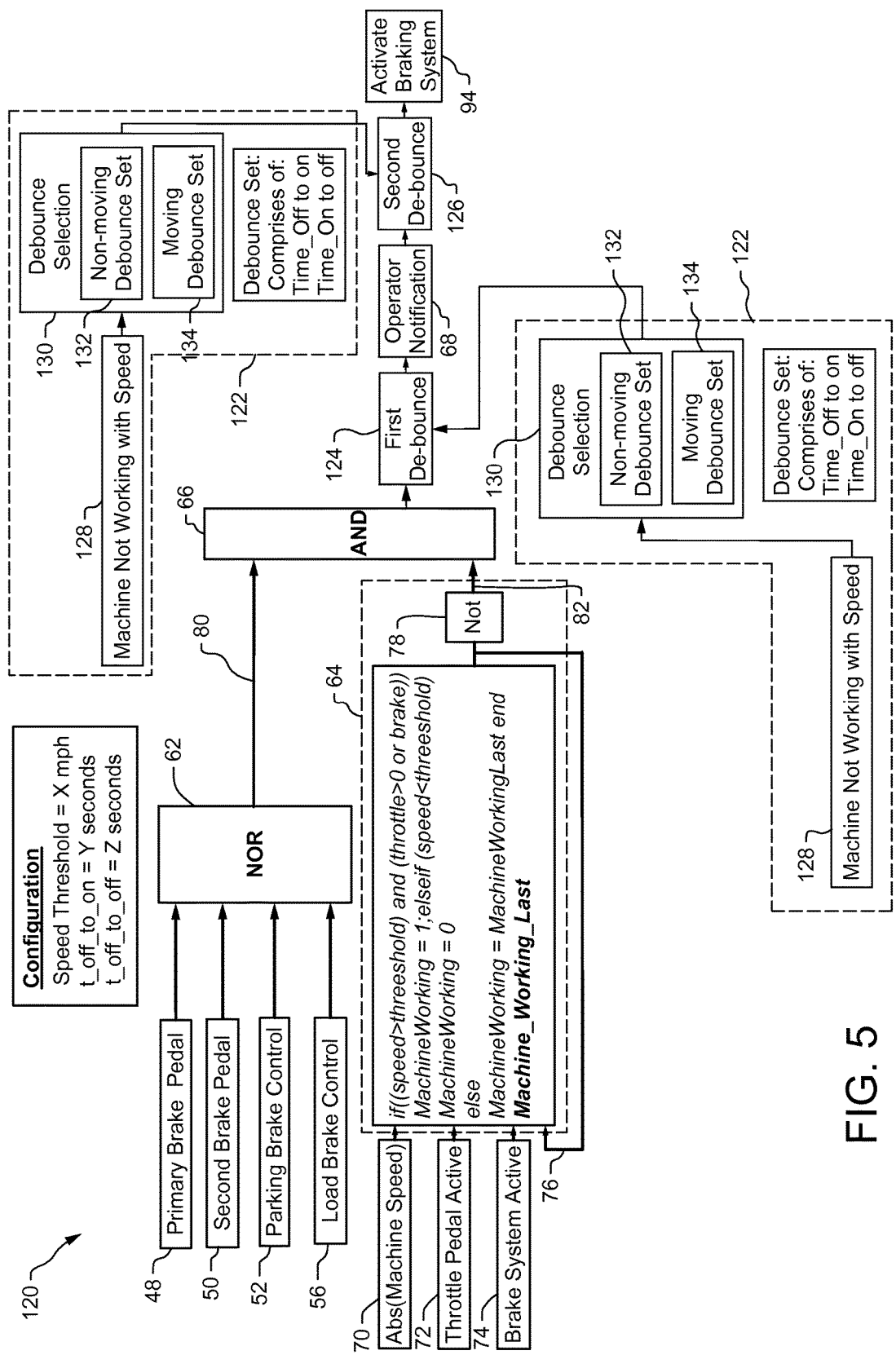
FIG. 5 is a flow diagram illustrating another example algorithm to alert an operator of a machine to apply a brake, in accordance with another embodiment.

In addition, the controller 42 may be configured to select the predetermined time delay of the first de-bounce and/or the second de-bounce as a function of the speed of the machine 20. For example, referring now to FIG. 5, with continued reference to FIGS. 1-4, flow diagram 120 illustrates another example algorithm that may be included in the control system 40 of the machine 20. For example, the algorithm may be programmed into the memory 44 of the controller 42. Flow diagram 120 may be similar to flow diagram 60 (FIG. 3) and flow diagram 90 (FIG. 4). However, flow diagram 120 may include de-bounce selection modules 122. A de-bounce selection module 122 may be applied to the first de-bounce 124 before operator notification in module 68 and/or to the second de-bounce 126 before automatic activation of the braking system 36 in module 94.

After determining the machine is in the inactive state in module 66, the controller 42 may be configured to determine whether the machine 20 is moving above a speed threshold, such as, in module 128. The speed threshold may be preprogrammed into the memory 44 of the controller 42, and may be the same or different speed threshold as that used in module 64. For example, the speed threshold used in module 128 may be zero (0) kph or rpm. In another example, the speed threshold may be five (5) kph. However, other values than zero (0) kph and five (5) kph may be used. In module 128, the controller 42 may be configured to compare the speed of the machine 20 to the speed threshold.

Based on the speed of the machine 20, the controller 42 in module 130 may select between a first de-bounce set 132 and a second de-bounce set 134 for the predetermined time delay of the first de-bounce and/or second de-bounce. Each of the first de-bounce set 132 and the second de-bounce set 134 may comprise a set period of time that is preprogrammed into the memory 44 of the controller 42. Although only two de-bounce sets 132, 134 for the predetermined time delay are described and shown in module 130, more than two de-bounce sets may be used to select from as a function of speed.

The second de-bounce set 134 may be a shorter time delay than the first de-bounce set 132. In one example, the first de-bounce set 132 may comprise a predetermined time delay of ten (10) seconds, and the second de-bounce set 134 may comprise a predetermined time delay of a quarter (0.25) of a second. However, other time delays may be used.

If, in module 128, the speed of the machine 20 is less than or equal to the speed threshold, the controller 42 may select the first de-bounce set 132 in module 130. If, in module 128, the speed of the machine 20 is greater than the speed threshold, the controller 42 may select the second de-bounce set 134, in module 130. The selected de-bounce set may then be implemented in the first de-bounce 124 and/or the second de-bounce 126. It is to be understood that a same or different de-bounce sets may be used for the first de-bounce 124 and the second de-bounce 126.

By applying de-bounce selection module 122 to the first de-bounce 124, the control system 40 may alert the operator of the machine 20 to apply the brakes sooner when the machine is moving than when the machine is not moving. Similarly, by applying de-bounce selection module 122 to the second de-bounce 126, the control system 40 may automatically activate the braking system 36 sooner when the machine is moving than when the machine is not moving. Furthermore, with de-bounce selection modules 122, the controller 42 may be configured to continue monitoring the speed of the machine 20 during the first de-bounce 124 and/or the second de-bounce 126.

For instance, if the first de-bounce set 132 is implemented in the first de-bounce 124 and/or the second de-bounce 126, the controller 42 may still check if the machine 20 is moving during that predetermined time delay. If, during the predetermined time delay of the first de-bounce set 132, the controller 42 in module 128 determines that the speed of the machine 20 is greater than the speed threshold, the controller 42 may then select the second de-bounce set 134, over-riding the previous selection of the first de-bounce set 132. The controller 42 may implement the second de-bounce set 134 and over-ride the first de-bounce set 132 if the time remaining in the first-de-bounce set is longer than the second de-bounce set 134. In so doing, the control system 40 may actively alert the operator earlier and/or engage the braking system 36 earlier when movement of the machine 20 is detected.

INDUSTRIAL APPLICABILITY

In general, the foregoing disclosure finds utility in various industrial applications, such as, in mining, earthmoving, construction, industrial, agricultural, and forestry machines. In particular, the disclosed load management system may be applied mining vehicles, on-highway vehicles, trains, earthmoving vehicles, loaders, excavators, dozers, motor graders, tractors, trucks, backhoes, agricultural equipment, material handling equipment, and the like. By applying the disclosed control system to a machine, operators may be alerted to apply the parking brake when the machine is in an inactive state. Furthermore, if after operator notification, the brakes are still not applied, the control system may automatically apply the parking brake. In so doing, the disclosed system provides two safeguards to prevent runaway machines, while at the same time, reducing false detection of stationary periods of the machine.

Figure 6:
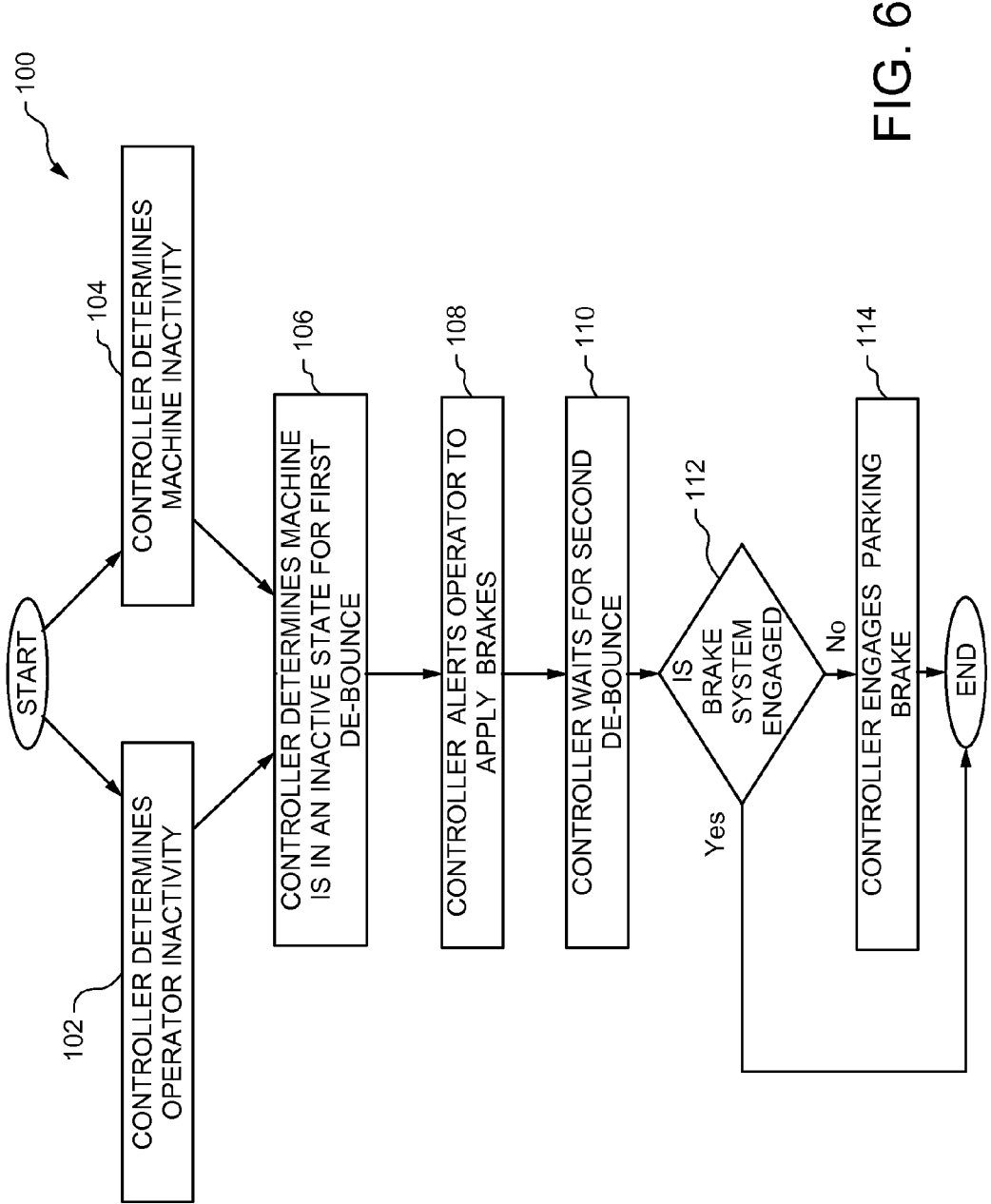
FIG. 6 is a flowchart illustrating a process for alerting an operator of a machine to apply a brake of the machine, in accordance with yet another embodiment.

Turning now to FIG. 6, with continued reference to FIGS. 1-5, a flowchart illustrating an example process 100 for alerting an operator of a machine 20 to apply a brake of the machine 20 is shown, in accordance with another embodiment. The process 100 may be programmed into the memory 44 associated with the controller 42 of machine 20. At block 102, the controller 42 may determine operator inactivity based on signals received from the operator interface 32. At block 104, the controller 42 may determine machine inactivity based at least in part on a signal indicative of the speed of the machine 20.

At block 106, the controller 42 may determine the machine 20 is in an inactive state based at least in part on determination of operator inactivity, in block 102, and machine inactivity, in block 104. The controller 42 may alert the operator to apply the brakes, at block 108. For example, if the machine 20 is in the inactive state for a predetermined time delay of a first de-bounce, in block 106, the controller 42 may then send a signal to the operator interface 32, in block 108. The operator interface 32 may provide a visual display and/or an audio sound in the operator cab 26 in order to remind the operator to apply the brakes.

The controller 42 may implement a second de-bounce, at block 110. If the controller 42 determines that the brakes are engaged, at block 112, then the process 100 is at an end. However, if the controller 42 determines the brakes are not engaged, at block 112, the controller 42 may then engage the parking brake 54, at block 114. For instance, the controller 42 may send a signal to an electro-hydraulic solenoid or proportional valve of the braking system 36 in order to engage the parking brake 54.

It is to be understood that the flowchart in FIG. 6 is shown and described as an example only to assist in disclosing the features of the control system 40, and that more or fewer steps that shown, in a same or different order, may be included in the method corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for a machine having a brake, the control system comprising:
    an operator interface configured to receive inputs from an operator of the machine, and output data to the operator of the machine,
        wherein the operator interface includes at least one of a throttle pedal, a first brake pedal, a second brake pedal, a parking brake control, and a load brake control; and
    a controller in communication with the operator interface, the controller configured to:
        monitor operator inputs received by the operator interface,
        monitor a speed of the machine, and
        send a signal to the operator interface to notify the operator to apply the brake based at least in part on the operator inputs and the speed of the machine.

2. The control system of claim 1, wherein the first brake pedal comprises a combo pedal for electric braking and mechanical braking.

3. The control system of claim 1, wherein the controller is further configured to compare the speed of the machine to a speed threshold preprogrammed into a memory associated with the controller.

4. The control system of claim 3, wherein the controller is further configured to determine the machine is in an inactive state when the throttle pedal, the first brake pedal, the second brake pedal, the parking brake control, and the load brake control are not actuated and the speed of the machine is less than the speed threshold.

5. The control system of claim 4, wherein the controller is further configured to implement a first de-bounce to determine when the machine is in the inactive state for a predetermined time delay.

6. The control system of claim 5, wherein the controller is further configured to send the signal to the operator interface to notify the operator to apply a brake after the predetermined time delay of the first de-bounce, and wherein the brake includes a parking brake.

7. The control system of claim 6, wherein the operator interface is further configured to provide at least one of a visual display and an audio sound to the operator upon receipt of the signal from the controller to notify the operator to apply the brake.

8. The control system of claim 7, wherein the controller is further configured to determine if the brake of the machine is engaged, and
    wherein the brake includes one or more of at least one of a first brake, a second brake pedal, a parking brake control, or a load brake.

9. The control system of claim 8, wherein the controller is further configured to implement a second de-bounce to determine if the brake was not engaged for a predetermined time delay, and send a signal to a braking system of the machine to engage a parking brake after the predetermined time delay of the second de-bounce, and
    wherein the brake includes one or more of at least one of a first brake, a second brake pedal, or a load brake.

10. The control system of claim 9, wherein the controller is configured to calculate at least one of the predetermined time delays of the first de-bounce and the second de-bounce based at least in part on the speed of the machine and an orientation of the machine.

11. The control system of claim 9, wherein at least one of the predetermined time delays of the first de-bounce and the second de-bounce is preprogrammed into the memory associated with the controller.

12. The control system of claim 11, wherein the controller is further configured to select the predetermined time delay of at least one of the first de-bounce and the second de-bounce as a function of the speed of the machine.

13. The control system of claim 12, wherein the controller is further configured to implement a first de-bounce set for the predetermined time delay if the speed of the machine is less than or equal to the speed threshold.

14. The control system of claim 13, wherein the controller is further configured to implement a second de-bounce set for the predetermined time delay if the speed of the machine is greater than the speed threshold, the second de-bounce set being shorter than the first de-bounce set.

15. A machine, comprising:
    a braking system including a brake;
    an operator interface configured to receive inputs from an operator of the machine, and output data to the operator of the machine; and
    a controller in communication with the braking system and the operator interface, the controller configured to:
        receive signals from the operator interface indicative of operator inputs,
        receive a signal indicative of a speed of the machine,
        determine whether the machine is in an inactive state based at least in part on the signals indicative of operator inputs and the speed of the machine, and
        send a signal to the operator interface to notify the operator to engage the brake when the machine is in the inactive state.

16. The machine of claim 15, wherein the speed of the machine includes at least one of a speed of a chassis of the machine and a speed of a traction device of the machine.

17. The machine of claim 15, wherein the controller is further configured to implement a first de-bounce to determine whether the machine is in the inactive state for a predetermined time delay.

18. The machine of claim 17, wherein the controller is further configured to select the predetermined time delay of the first de-bounce based on the speed of the machine.

19. The machine of claim 15, wherein the controller is further configured to determine whether the braking system is engaged based on signals received from the braking system.

20. The machine of claim 19, wherein the controller is further configured to send a signal to the braking system in order to engage a parking brake if the braking system was not engaged during a predetermined time delay.

21. A method for alerting an operator of a machine to apply a brake of the machine, the machine having a controller in communication with an operator interface, the method comprising:
  determining operator inactivity based on signals received from the operator interface using the controller;
  determining machine inactivity based at least in part on a signal indicative of a speed of the machine using the controller;
  determining the machine is in an inactive state based at least in part on determination of operator inactivity and machine inactivity using the controller; and
  alerting the operator to apply the brake when the machine is in the inactive state using the controller.

22. The method of claim 21, further comprising determining, using the controller, machine inactivity based at least in part on whether a throttle pedal is in use and a braking system is in use.

23. The method of claim 21, further comprising sending, by the controller, a signal to a braking system of the machine in order to engage a parking brake of the machine if the brake was not engaged during a predetermined time delay after alerting the operator to apply the brake.

24. The method of claim 21, further comprising providing at least one of a visual display or an audio sound to the operator based on a signal to alert the operator to apply the brake.

* * * * *